No. 879,794. PATENTED FEB. 18, 1908.
B. H. PADDACK & A. A. DINWIDDIE.
OILING DEVICE.
APPLICATION FILED FEB. 15, 1907.
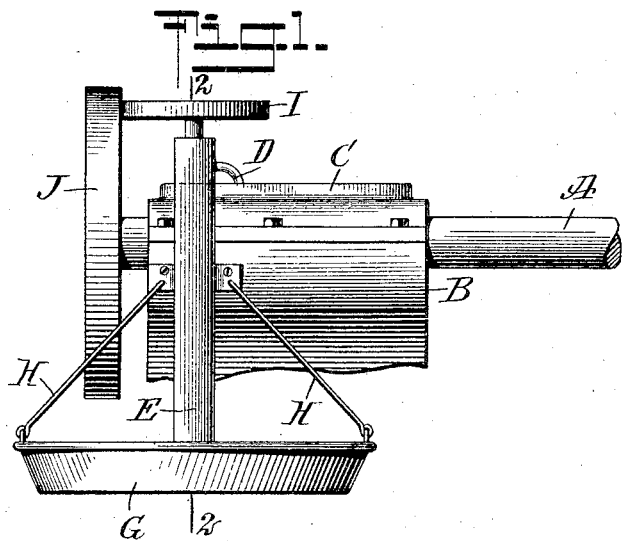
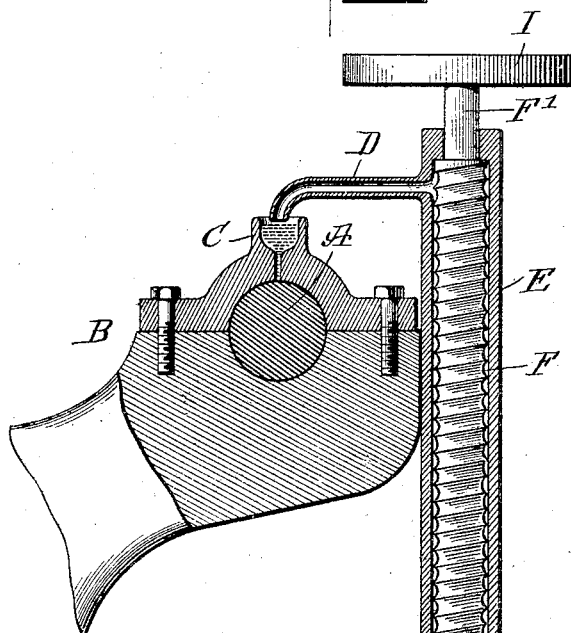
WITNESSES
INVENTORS
Benjamine H. Paddack
Alva A. Dinwiddie
BY
ATTORNEYS

UNITED STATES PATENT OFFICE.

BENJAMINE HENRY PADDACK AND ALVA ALLEN DINWIDDIE, OF GRANADA, COLORADO.

OILING DEVICE.

No. 879,794.  Specification of Letters Patent.  Patented Feb. 18, 1908.

Application filed February 15, 1907. Serial No. 357,490.

*To all whom it may concern:*

Be it known that we, BENJAMINE HENRY PADDACK and ALVA ALLEN DINWIDDIE, both citizens of the United States, and residents of Granada, in the county of Prowers and State of Colorado, have invented a new and Improved Oiling Device, of which the following is a full, clear, and exact description.

The object of the invention is to provide a new and improved oiling device, more especially designed for oiling the bearings of shafts, axles and other machine parts, and arranged to automatically deliver the proper amount of oil to the part of the machine as long as the latter is running, to stop feeding the oil when the machine is stopped, and to re-use the drip oil, thus rendering the device very economical in the use of oil and at the same time insuring the continuous and proper oiling of the part.

The invention consists of the novel features and parts and combinations of the same which will be more fully described hereinafter and then pointed out in the claims.

A practical embodiment of the invention is represented in the accompanying drawings forming a part of this specification, in which similar characters of reference indicate corresponding parts in both views.

Figure 1 is a side elevation of the improvement; and Fig. 2 is an enlarged transverse section of same on the line 2—2 of Fig. 1.

The shaft A to be oiled runs in a suitable bearing B having oil cups C into which the oil is discharged from a discharge spout D held on the upper end of a barrel E of a pump of the Archimedean type; that is, one having a screw F fitting snugly into the barrel E and rotating therein, the said barrel E being preferably secured to one side of the bearing B. The lower end or suction end E' of the barrel E is immersed in the oil contained in a pan G arranged below the bearing B so as to form a drip pan for the same, and with a view to receive all drip oil that may drip down the bearing B. The pan G is suspended from the bearing B or from the barrel E by suitable braces H as indicated in Fig. 1. A shaft F' on the upper end of the screw F is provided with a friction wheel I in frictional contact with one face of a friction wheel J secured on the shaft A so that when the latter is rotating, then the friction wheels J and I are rotated, and consequently the screw F is rotated so as to raise oil from the pan G into the discharge spout D, from which the oil flows into the oil cup C and to the shaft A to be lubricated.

As soon as the shaft A stops rotating, then the rotation of the screw F ceases and consequently oil is only delivered from the pan G to the oil cup C as long as the shaft A is running. As the drip oil from the bearing B passes down into the pan G, it is evident that the said drip oil is re-used and consequently oil is furnished to the shaft and bearing as long as the suction end E' of the barrel E is immersed in the oil contained in the pan G.

Although we have shown and described a friction drive between the shaft A and screw F, it is evident that other means may be employed for rotating the screw F from the shaft A.

The driving mechanism may be varied according to the speed of the shaft on which the device is applied; that is, a higher gearing is desirable for a slowly-moving shaft A, and a worm gear is preferred for a fast-moving shaft A.

The device is very simple and durable in construction and is not liable to get easily out of order.

Having thus described our invention, we claim as new and desire to secure by Letters Patent:

1. An oiling device for the bearings of shafts and other rotating parts, comprising a pump having a barrel and a screw rotating therein and having an uninterrupted thread from end to end of the screw, the said barrel being secured to the bearing supporting the shaft to be lubricated and extending at its upper end above the top of said bearing, the barrel having a discharge spout at its upper end, a vessel for containing the oil and extending beneath the bearing to receive the drip oil from said bearing, the suction end of the pump barrel being immersed in the oil in the vessel and the discharge spout of the said barrel extending over the said bearing and discharging into the oil cup of the bearing, and a direct driving connection between the shaft to be lubricated and the said screw.

2. The combination with a bearing having an oil cup at its upper face and a horizontal shaft to be oiled, the said shaft being mounted to turn in said bearing, and provided at one end with a friction wheel, of a pump comprising a vertically arranged barrel secured to one side of said bearing and extending above the same, the said barrel having a spout near its upper end extending over the said bearing and discharging into the said oil cup, and a screw adapted to rotate in the barrel and having a shaft at its upper end provided with a friction wheel in engagement with the friction wheel on said horizontal shaft, a pan for containing the oil and extending beneath the bearing to receive the drip oil from said bearing, and means for suspending said pan, the lower or suction end of the pump barrel being immersed in the oil in the pan.

In testimony whereof we have signed our names to this specification in the presence of two subscribing witnesses.

BENJAMINE HENRY PADDACK.
ALVA ALLEN DINWIDDIE.

Witnesses:
J. ARTHUR LARGE,
ANDREW TOWNSLEY.